UNITED STATES PATENT OFFICE.

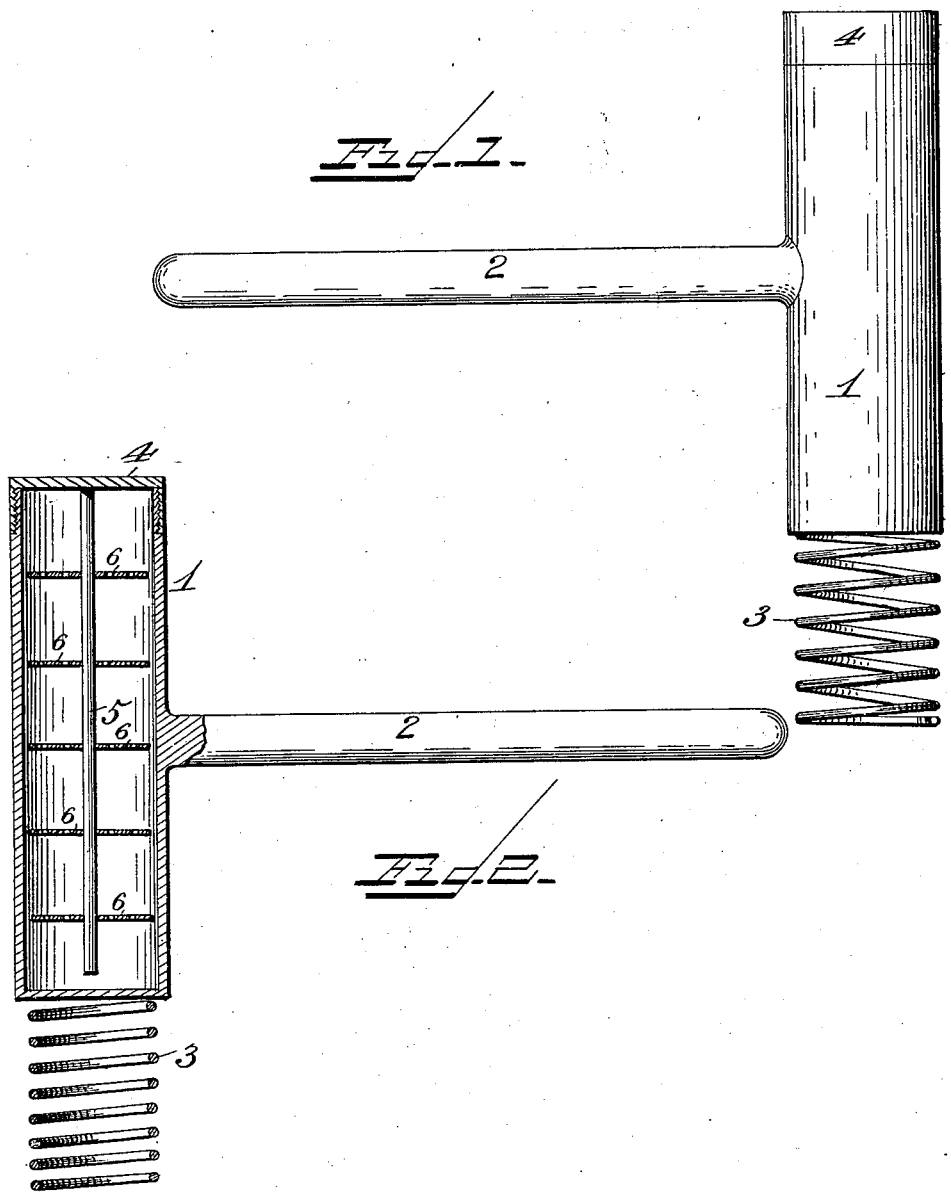

SAMUEL E. CHAPMAN, OF NAPA, CALIFORNIA.

EGG-BEATER.

SPECIFICATION forming part of Letters Patent No. 632,044, dated August 29, 1899.

Application filed June 3, 1899. Serial No. 719,227. (No model.)

*To all whom it may concern:*

Be it known that I, SAMUEL E. CHAPMAN, a citizen of the United States, residing at Napa, in the county of Napa and State of California, have invented new and useful Improvements in Egg-Beaters and Liquid-Mixers, of which the following is a specification.

My invention relates to devices for beating eggs, mixing liquids, and for other analogous purposes; and its object is to provide an improved construction of the same which shall possess superior advantages with respect to efficiency in use.

The invention consists, essentially, in a cylindrical receptacle designed to contain the material or articles to be mixed or agitated, provided with a handle about midway of its ends and with a coiled spring secured to the lower end and provided at the upper end with a removable cap or cover having a rod secured thereto provided with a number of perforated disks which are located in the receptacle, as hereinafter fully described and claimed.

In the accompanying drawings, Figure 1 is a side elevation of a mixing or agitating device constructed in accordance with my invention. Fig. 2 is a central longitudinal section of the same.

In the said drawings the reference-numeral 1 designates a cylindrical receptacle, of metal or other suitable material, provided about midway of its ends with a handle 2, securely fixed thereto. At the lower end there is secured to said receptacle a coiled spring 3. At the upper end the said receptacle is provided with a removable cap or cover 4, having a vertical rod 5, which extends down into the receptacle to or nearly to the lower end of the same, which is closed. Secured to the said rod are a number of perforated disks 6.

The manner of using the device is as follows: The eggs to be beaten or the liquid or other material to be mixed or agitated is placed in the receptacle and the cap or cover attached thereto. By now grasping the handle and rapidly striking the coiled spring on any suitable object the contents of the receptacle will be rapidly and efficiently mixed or agitated. The said spring prevents any injury to the device by reason of the blows struck and also causes the receptacle to rebound after the blows have been struck.

The invention will be found to be particularly applicable for beating eggs and mixing liquors for beverages, but can also be used for many other analogous purposes.

Having thus fully described my invention, what I claim is—

1. In a mixing or agitating device, the combination with the receptacle provided with a handle and the coiled spring secured to said receptacle, of the removable cap or cover, substantially as described.

2. In a mixing or agitating device, the combination with the receptacle provided with a handle and the spring at the lower end of the receptacle, of the removable cap or cover, the rod secured thereto and the perforated disks secured to said rod, substantially as described.

In testimony whereof I have hereunto set my hand in presence of two subscribing witnesses.

SAMUEL E. CHAPMAN.

Witnesses:
 P. S. KING,
 E. H. KING.